United States Patent [19]

Welter

[11] 4,341,250
[45] Jul. 27, 1982

[54] SPLIT CARCASS TIRE

[75] Inventor: Thomas N. H. Welter, Luxembourg, Luxembourg

[73] Assignee: The Goodyear Tire & Rubber Company, Akron, Ohio

[21] Appl. No.: 229,685

[22] Filed: Jan. 29, 1981

[51] Int. Cl.³ .......................... B60C 9/04; B60C 9/20
[52] U.S. Cl. ........................... 152/354 R; 152/361 R; 152/361 FP
[58] Field of Search ........ 152/330 R, 354 R, 354 RB, 152/355, 356 R, 356 A, 361 R, 361 FP, 361 DM; 156/123 A

[56] References Cited

U.S. PATENT DOCUMENTS 2,894,555 7/1959 Bourdon .......................... 152/361 R
3,161,220 12/1964 Beckadolph ..................... 152/361 R
4,240,488 12/1980 Wilcox .......................... 152/361 DM

FOREIGN PATENT DOCUMENTS 947207 1/1964 United Kingdom ............... 152/356

Primary Examiner—Edward C. Kimlin
Assistant Examiner—Lois E. Boland
Attorney, Agent, or Firm—Frank Pincelli

[57] ABSTRACT

A belted tire of split carcass construction. A first reinforcing ply extends from a first bead through a first sidewall and into the crown portion past the mid-circumferential plane of the tire. A second reinforcing ply extends from a second bead through a second sidewall and into the crown portion past the mid-circumferential plane of the tire between the first ply and the belt structure and beyond the belt structure to a location radially outwardly of the mid-section height of the tire where it is redirected 180 degrees. The redirected portion of the second ply, in accordance with an aspect of the invention, is disposed in at least partially overlapping relation with the belt structure and is disposed radially outwardly of the belt structure to at least partially encapsulate the belt structure.

18 Claims, 4 Drawing Figures

SPLIT CARCASS TIRE

This invention is related to tires. More particularly, this invention relates to tires of the split carcass type; that is, tires whose carcasses comprise independent plies extending through each sidewall and into the crown portion and which partially overlap in the crown portion to provide uninterrupted reinforcement of the tires.

It is an object of an aspect of the invention to provide optimum comfort in tires of a split carcass type.

It is an object of another aspect of this invention to provide belted tires of the split carcass type with improved strength.

It is an object of another aspect of this invention to provide belted tires of the split carcass type which have improved stabilization of the carcass structure.

It is an object of yet another aspect of this invention to provide improved cornering and camber thrust in tires of the split carcass type.

It is an object of still another aspect of this invention to provide enhanced stiffness in the shoulder regions of tires of the split carcass type for improved high-speed performance.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 1:
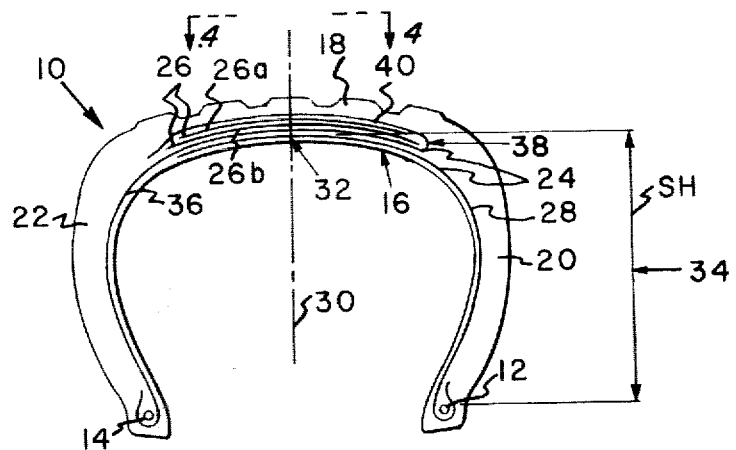
FIG. 1 is a schematic view of a partial cross-section of a tire embodying this invention.

Referring to FIG. 1, there is shown a tire 10 which rotates during normal use on a vehicle about its rotational axis. The tire 10 is a composite reinforced elastomeric structure of toroidal shape which is provided with a first and a second circular inextensible bead 12 and 14, respectively, for mounting of the tire 10 on a rim. A crown portion 16 extends circumferentially about the rotational axis of the tire 10. Outwardly of the crown portion 16 is provided a ground-engaging tread 18. A first sidewall portion 20 and a second sidewall portion 22 extend from opposite edges, respectively, of the crown portion 16 to the first bead 12 and second bead 14, respectively. The tire 10 is further provided with a carcass structure 24 which provides reinforcement in the sidewall and crown portions of the tire 10, and a belt structure 26 in the crown portion 16.

Figure 3:
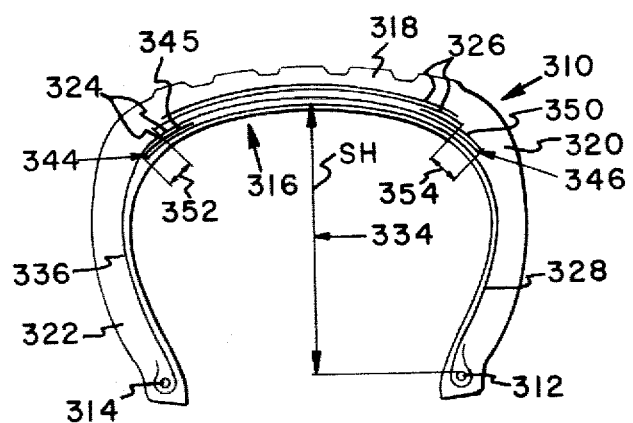
FIG. 3 is a view similar to that of FIG. 1 showing another alternative embodiment of this invention.

A first reinforcing ply 28 of the carcass 24 is anchored to and extends from the first bead 12 through the first sidewall portion 20 and into the crown portion 16 past the mid-circumferential plane 30 of the tire 10. By "mid-circumferential plane" is meant a plane which is perpendicular to the rotational axis of a tire and which lies midway between the lateral edges of the tread surface. Lateral edges of the tread surface are determined by the tire's footprint; that is, the portions of the tire that touch the ground when the tire is mounted on a vehicle under rated load and inflation pressure. The first reinforcing ply 28 terminates at a point radially outwardly of the mid-section height of the tire. As used herein, "section height" refers to the distance in the radial direction between a bead and the radially innermost point where the mid-circumferential plane intersects the carcass of a tire when the tire is unloaded and under rated pressure, and is illustrated in FIGS. 1 and 3 as SH. The radially innermost point where the mid-circumferential plane 30 of the tire 10 intersects the carcass 24 is illustrated at 32 in FIG. 1. The mid-section height, which is midway between a bead and point 32 in the radial direction is illustrated at 34. The terms "radial" or "radially" refer to a direction perpendicular to the rotational axis of a tire.

A second reinforcing ply 36 is anchored to and extends from the second bead 14 through the second sidewall portion 22 and into the crown portion 16 between the first ply 28 and the belt structure 26. The second ply 36 further extends past the mid-circumferential plane 30 of the tire 10 to partially overlap the first ply 28.

Figure 4:
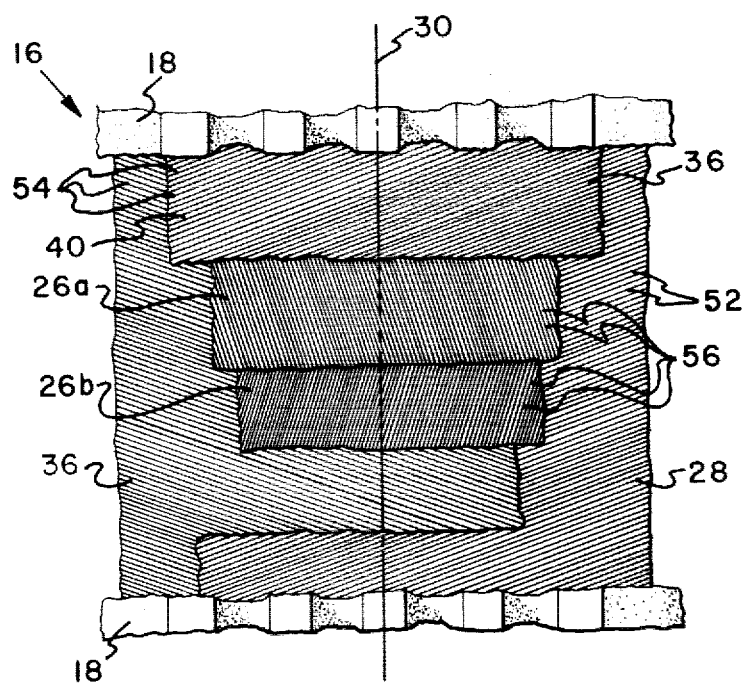
FIG. 4 is a fragmentary view of a tread portion of the tire of FIG. 1 taken along line 4—4 thereof with parts broken away to show the reinforcing structure of the tire.

As shown in FIG. 4, each of the first and second reinforcing plies 28 and 36, respectively, is composed of fabric having generally parallel reinforcing cords 52 and 54, respectively, impregnated with elastomeric material, the reinforcing cords 52 and 54 extending at an oblique angle relative to the mid-circumferential plane 30 of the tire 10. The cords 52 of the first ply 28 extend at an opposed angle relative to the cords 54 of the second ply 36, thus providing a tire which may be characterized as "directional". In other words, the tire will exhibit different properties depending upon its direction of rotation to provide advantages such as optimum comfort during driving and maximum braking effect.

The reinforcing cords of both the carcass 24 and the belt structure 26 may be of any material such as rayon, steel, nylon, flexten, or any other material which is consistent with good engineering practice, and this invention should, therefore, not be construed as being limited to any particular material. The cord angle of the reinforcing cords of both the carcass and the belt structure may be of any cord angle which is consistent with good engineering practice, and this invention should not therefore be construed as being limited to any particular angle.

In accordance with a preferred embodiment of this invention, the cords 52 and 54 of both the first and second reinforcing plies 28 and 36, respectively, extend at an angle relative to and at the mid-circumferential plane 30 of the tire 10 of between about 65 and 85 degrees such as about 70 degrees as shown in FIG. 4. The carcass plies are preferably composed of rayon or other low modulus material.

As also shown in FIG. 4, the belt structure 26 is composed of one or more belts each containing a plurality of generally parallel reinforcing cords 56 impregnated with elastomeric material and which extend at an angle relative to and at the mid-circumferential plane 30 of preferably between about 15 and 25 degrees such as about 18 degrees as shown in FIG. 4. The cords of the belt structure 26 are composed preferably of steel or other high modulus material.

After extending past the mid-circumferential plane 30, the second ply 36 further extends beyond the belt structure 26 to a location illustrated at 38 which is located radially outwardly of the mid-section height 34 of the tire 10 at which location 38 the second ply 36 is redirected 180 degrees. The redirected portion 40 of the second ply 36 is disposed radially outwardly of and in at least partially overlapping relation with the belt structure 26 to provide improved stabilization of the split carcass. Redirected portion 40 may further extend past the belt structure 26 as shown in FIG. 1 to fully encapsulate it. Such a construction also eliminates exposed cut end cords on one side of the belt structure 26.

Although a tire embodying this invention may contain a single belt layer or an odd number of belt layers, it is preferred that the belt structure 26 comprise an even number of belt layers such as shown by the two belt layers 26a and 26b in FIG. 1 so that the cords of each layer of cord fabric may be provided to extend in an opposed direction relative to the mid-circumferential plane to the direction which the cords of each adjacent reinforcing layer of the carcass and belt structure extend, as clearly shown in FIG. 4, to provide improved triangulation of the cords for improved strength in the tire.

In a preferred embodiment of this invention, wherein the reinforcing cords 56 of the belt structure 26 are metallic, the reinforcing cords of the carcass 24 (or at least the reinforcing cords 54 of the second ply 36 thereof) are non-metallic. This results in encapsulation of the metallic cords 56 of the belt structure 26 by the non-metallic cords 54 of the carcass structure 24 to provide cushioning against the metallic harshness of the belt structure 26 for improved ride and handling.

Figure 2:
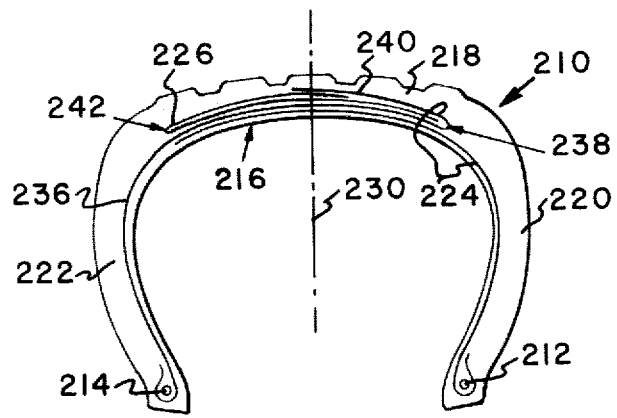
FIG. 2 is a view similar to that of FIG. 1 showing an alternative embodiment of this invention.

FIG. 2 shows an alternative embodiment of a tire 210 embodying this invention and comprising beads 212 and 214, a crown portion 216, tread 218, sidewall portions 220 and 222 and a carcass structure 224 similar to the corresponding components of the tire 10 of FIG. 1. The tire 210 is provided with a belt structure 226 which comprises a single belt of reinforcing cords which is folded at one end of the belt structure 226 near one of the tread edges to provide two belt layers. The second ply 236 extends past the other end of the belt structure 226 near the other tread edge where it is redirected 180 degrees, and the redirected portion 240 of the second ply 236 at least partially overlaps each of the layers of reinforcing cords of the belt structure 226. In other words, the fold line illustrated at 242 of the folded belt is located on the opposite side of the mid-circumferential plane 230 of the tire 210 from the location 238 where the second ply 236 is redirected, and the redirected portion 240 is disposed at least partially radially outwardly of each layer of the folded belt structure 226. Such a construction results in eliminating exposed cut end cords at each of the tread edges.

FIG. 3 shows an alternative embodiment of a tire 310 embodying this invention and comprising beads 312 and 314, a crown portion 316, tread 318, sidewall portions 320 and 322, and a belt structure 326 similar to the corresponding components of tire 10 of FIG. 1. In this embodiment, the tire 310 is provided with a carcass structure 324 including a first reinforcing ply 328 which extends past the belt structure 326 and into the second sidewall portion 322 a distance 352 equal to at least one-tenth and not more than one-half (preferably not more than one-fifth) of the section height of the tire 310 to a location 344 located radially outwardly of the mid-section height 334 of the tire 310 at which location 344 first ply 328 is redirected 180 degrees to provide enhanced stiffness for good high-speed performance in the associated shoulder regions. The redirected portion 345 of first ply 328 extends to a location which is axially inwardly of a lateral edge of the belt structure 326. By "axially" is meant a direction parallel to the rotational axis of a tire. The carcass structure 324 is further provided with a second reinforcing ply 336 which extends beyond the belt structure 326 on the other side of the tire 310 and into the first sidewall portion 320 a distance 354 equal to at least one-tenth and not more than one-half (preferably not more than one-fifth) of the section height of the tire 310 to a location 346 located radially outwardly of the mid-section height 334 of the tire 310 at which location 346 the second ply 336 is redirected 180 degrees to provide enhanced stiffness for good high-speed performance in the associated shoulder region. The redirected portion 350 of the second ply 336 extends to a location which is axially inwardly of a lateral edge of the belt structure 326. The width of the belt structure 326 is preferably substantially equal to the tread width; that is, the distance between the lateral edges of the tread 318. Although both reinforcing plies 328 and 336 are shown in FIG. 3 to extend to locations 344 and 346 respectively where they are redirected, a tire embodying this invention may be provided with only one ply being redirected. For example, the second ply 336 may extend to location 346 where it is redirected to provide improved cornering and camber thrust, and the first ply 328 may not be redirected.

A tire in accordance with another embodiment of this invention may be provided with a first reinforcing ply such as first ply 328 of FIG. 3 which extends beyond the belt structure and into a second sidewall to a location such as shown in FIG. 3 at 334 where it is redirected 180 degrees, and a second reinforcing ply such as second ply 36 of FIG. 1 which at least partially encapsulates the belt structure. A tire in accordance with still another embodiment of this invention may be provided with a second reinforcing ply such as second ply 336 of FIG. 3 which extends beyond the belt structure to a location such as shown in FIG. 3 at 346 wherein the second ply is redirected 180 degrees and the redirected portion at least partially overlaps the belt structure such as shown by the redirected portion 40 of FIG. 1.

While certain representative embodiments and details have been shown for the purpose of illustrating the invention, it will be apparent to those skilled in the art that various changes and modifications may be made therein without departing from the spirit or scope of the invention.

What is claimed is:

1. A directional tire having a rotational axis and comprising a first and a second bead, a crown portion, first and second sidewall portions extending respectively from opposite edges of the crown portion to the first and second beads respectively, a belt structure in the crown portion, and a carcass including a first reinforcing ply anchored to and extending from the first bead through the first sidewall portion and into the crown portion past the mid-circumferential plane of the tire and terminating radially outwardly of the mid-section height of the tire, said carcass further including a second reinforcing ply anchored to and exending from the second bead through the second sidewall portion and into the crown portion between said first ply and said belt structure and past the mid-circumferential plane of the tire to partially overlap said first ply, said second ply further extending beyond said belt structure to a location disposed radially outwardly of the mid-section height of the tire at which location said second ply is redirected 180 degrees, the redirected portion of said second ply is disposed radially outwardly of and in at least partial overlapping relation with said belt structure.

2. A tire according to claim 1, wherein said belt structure comprises at least one folded belt, the fold line of said belt being disposed on the opposite side of the mid-circumferential plane of the tire from said location where said second ply is redirected.

3. A tire according to claim 2, wherein the redirected portion of said second ply at least partially overlaps both layers of said folded belt.

4. A tire according to any one of claims 1, 2 or 3, wherein the redirected portion of said second ply extends past the mid-circumferential plane of the tire and beyond said belt structure.

5. A tire according to any one of claims 1, 2 or 3, wherein said first ply extends past said belt structure to a location radially outwardly of the mid-section height of the tire at which location said first ply is redirected 180 degrees.

6. A tire according to claim 5, wherein the distance which said first ply extends past said belt structure is equal to at least one-tenth of and not more than one-half the section height of the tire.

7. A tire according to claim 6, wherein the distance which said first ply extends past said belt structure is equal to not more than one-fifth of the section height of the tire and the redirected portion of said first ply extends to a location which is axially inwardly of a lateral edge of said belt structure.

8. A tire according to any one of claims 1, 2 or 3, wherein the distance which said second ply extends past said belt structure to said location where said second ply is redirected is equal to at least one-tenth and not more than one-fifth of the second height of the tire.

9. A tire according to claim 8, wherein said first ply extends past said belt structure to a location radially outwardly of the mid-section height of the tire at which location said first ply is redirected 180 degrees and the redirected portion thereof is disposed to a location axially inwardly of a lateral edge of the belt structure.

10. A directional tire having a rotational axis and comprising a first and second bead, a crown portion, first and second sidewall portions extending respectively, a belt structure in the crown portion, and a carcass including a first reinforcing ply extending from the first bead through the first sidewall portion and into the crown portion past the midcircumferential plane of the tire and terminating radially outwardly of the mid-section height of the tire, said carcass further including a second reinforcing ply extending from the second bead through the second sidewall portion and into the crown portion between said first ply and said belt structure and past the mid-circumferential plane of the tire to partially overlap said first ply, said second ply further extending beyond said belt structure and into said first sidewall portion a distance equal to at least one-tenth and not more than one-half of the section height of the tire to a location disposed radially outwardly of the mid-section height of the tire at which location said second ply is redirected 180 degrees.

11. A tire according to claim 10, wherein said first ply extends past said belt structure to a location radially outwardly of the mid-section height of the tire at which location said first ply is redirected 180 degrees.

12. A tire according to claim 11, wherein the distance which said first ply extends past said belt structure is equal to at least one-tenth and not more than one-fifth of the section height of the tire.

13. A tire according to any one of claims 10, 11 and 12, wherein the distance which said second ply extends past said belt structure is equal to not more than one-fifth of the section height of the tire.

14. A tire according to claim 13, wherein the redirected portion of said second ply extends to a location which is axially inwardly of a lateral edge of said belt structure.

15. A directional tire having a rotational axis and comprising a first and a second bead, a crown portion, first and second sidewall portions extending respectively from opposite edges of the crown portion to the first and second beads respectively, a belt structure in the crown portion, and a carcass including a first reinforcing ply extending from the first bead through the first sidewall portion and into the crown portion past the mid-circumferential plane of the tire, said first reinforcing ply further extending beyond the belt structure and into the second sidewall portion a distance equal to at least one-tenth and no more than one-half of the section height of the tire to a location disposed radially outwardly of the mid-section height of the tire at which location said first ply is redirected 180 degrees, said carcass further including a second reinforcing ply extending from the second bead through the second sidewall portion and into the crown portion between said first ply and said belt structure and past the mid-circumferential plane of the tire to partially overlap said first ply, said second ply terminating radially outwardly of the mid-section height of the tire.

16. A tire according to claim 15, wherein said first ply extends past said belt structure a distance equal to not more than one-fifth of the second height of the tire.

17. A tire according to claim 15 or 16, wherein the redirected portion of said first ply extends to a location which is axially inwardly of a lateral edge of said belt structure.

18. A tire according to any one of claims 1, 2, 3, 10, 11, 12, 15 or 16, wherein said first and second plies each have reinforcing cords which extend at an angle relative to and at the mid-circumferential plane of the tire of between about 65 and 85 degrees, the cords of said first ply extending in an opposed direction to the direction in which the cords of said second ply extend.

* * * * *